Nov. 23, 1937.   O. N. WHITEHEAD ET AL   2,099,950
HARNESS CORD
Filed Jan. 11, 1936
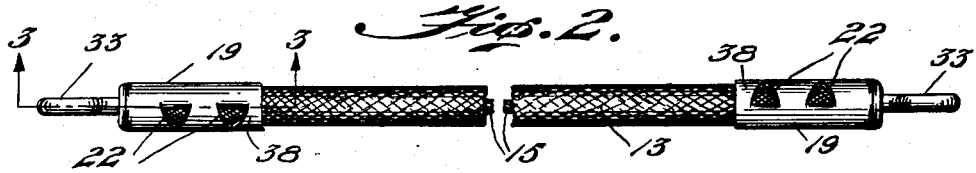
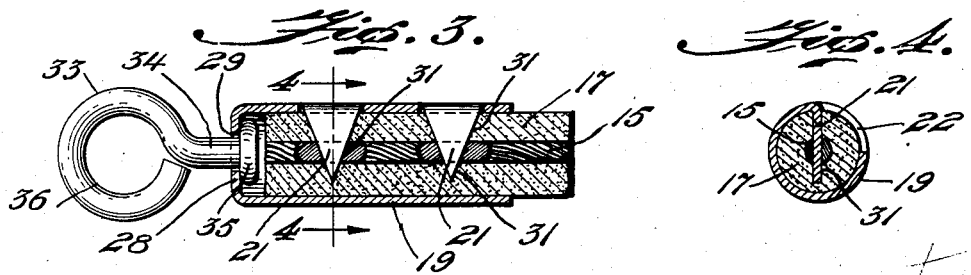
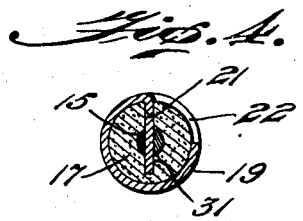
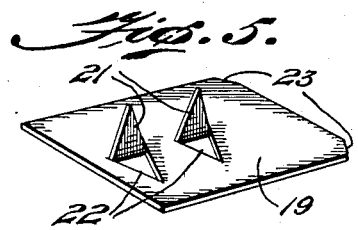
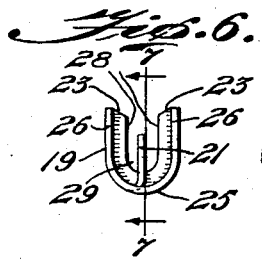
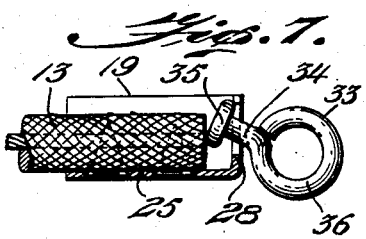
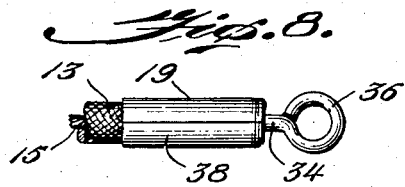
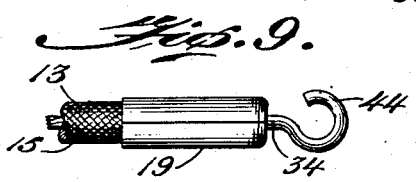
Inventors
Oscar N. Whitehead and
Walter H. Ibelle
By Horatio E. Bellows
Attorney Patented Nov. 23, 1937

2,099,950

UNITED STATES PATENT OFFICE 2,099,950

HARNESS CORD

Oscar N. Whitehead and Walter H. Toelle, Wallingford, Conn., assignors, by mesne assignments, to The Danielson Manufacturing Company, a corporation of Connecticut Application January 11, 1936, Serial No. 58,681

2 Claims. (Cl. 24—123)

Our invention relates to harness supports or cords adapted for use in various types of harness motion. The ends of each cord connect a heddle or harness frame with a jack, lever, or other motion transmitting element of the shedding mechanism of the loom.

Heretofore in devices of this character it was attempted, in order to insure an adequately strong interengagement of the terminal attaching eyes to a cord comprising a flexible wire core and a textile sheath enclosed at each end with a ferrule having an end perforation, to forcibly screw the threaded tapering shank of a screw eye endwise through the perforation into the core longitudinally thereof thereby expanding the wires to clamp the surrounding portion of the sheath into contact with the ferrule to frictionally hold the latter.

This construction deformed the core and dispersed the wires, which were also cut or weakened by the screw thread, in the area around the screw thus facilitating accidental escape of the screw eye and ferrule under operating strain.

The engagement of the rigidly mounted attaching eyes or hooks upon the harness frames with the rigidly fixed eyes of the cord often twisted the latter and thus induced torsional strain in the cord, thereby shortening the life of the latter.

The essential objects of our invention are to obviate all the above mentioned weaknesses and disadvantages, and insure in a device of this character length of life; absence of torsional and other strains; security against possible escape of the attaching members and ferrules; and to secure these objects in a simple and strong structure, and by an inexpensive process.

Other objects and advantages will be hereinafter adverted to.

To all the above ends primarily our invention consists in such parts and in such combinations of parts, and in such steps and combination of steps as fall within the scope of the appended claims.

In the accompanying drawing,

Figure 1 is a longitudinal view of a harness cord embodying our invention,

Figure 2, a similar view of the same in a different position,

Figure 3, an enlarged section partially in side elevation taken on line 3—3 of Figure 2, Figure 4, a section taken on line 4—4 of Figure 3, Figure 5, a perspective view of the original blank from which the rivet is ultimately formed including the upturned prongs cut therein, Figure 6, an end view of this blank bent up U-shape, Figure 7, a section taken on line 7—7 of Figure 6 showing the parts during assemblage, Figure 8, a side elevation of the swivel and attached parts after assemblage, and Figure 9, a side elevation of a modified form of our invention.

Like reference characters indicate like parts throughout the views.

As herein illustrated our device includes a flexible body or cord proper 13 comprising in this instance a flexible multi-strand twisted core or cable 15 of metal wire, enclosed in a sheath 17 of any preferred material, but in this instance of a braided textile.

Upon the ends of the body 13 are ferrules formed from substantially oblong blanks 19 cut from thin sheet metal each of said blanks provided medially of its width with one or more, in this case two, flat integral upright V-shaped prongs 21 cut from the material of the blank and upwardly bent from the resultant orifices 22, as shown in Figure 5. Two corners on one end of the blank are diagonally cut away as at 23.

Next by suitable tools one of the above blanks is bent with its medial portion 25 transversely curved and its lateral portions 26 upwardly directed, forming a trough. The end of the blank having the cut away corners at 23 is also during this operation bent inwardly forming an inturned end or end flange 28 forming the inception of a central curved opening 29, all of which is apparent in Figure 6.

One end margin of the cord body 13 is now mechanically driven downwardly sidewise into the trough thereby forcing the prongs 21 diametrically through the core 15 and a thickness of the sheath 17, creating resultant frictional cavities 31 therethrough for their reception. The end of the cord body during this operation is preferably spaced somewhat from the flange or ferrule end 28 to admit a portion of an attaching member 33 to temporarily rest in such space, as shown in Figure 7. The member 33 comprises a shank or neck 34, a retaining head 35 upon its inner end, and a closed eye 36 upon its outer end.

The final step is, by suitable dies, to depress upon the cord body the upwardly extending portions of the trough, thus completing the cylindrical side wall 38, the circular end wall 28, of the ferrule 19, the latter wall being provided with the completed resultant circular opening 29 through which loosely passes the shank or neck 34. The head 35 rotatably engages the inner face of the ferrule end wall 28. The member 33 is thus swivelly mounted in the ferrule.

The second ferrule 19 is formed and applied to the opposite end of the flexible body 13 with its attaching member 33 engaged therein, by the method above set forth.

The closed eyes 36 are particularly adapted for engagement with stationary hooks fixed upon the harness frames or levers, or to receive textile filaments knotted therethrough. An unclosed or open eye 44, as that shown in Figure 9, may be used with greater facility than the closed eye 36 upon one or both ends of the body, when the harness frame connections or lever connections consist of fixed eyes.

It will be noted that the prongs 21 make accidental escape of the ferrule and swivel member 33 impossible under any operating strain. The extension of the prongs through both the core and sheath not only increases the immovability of the ferrule, but further insures against movement of the sheath relatively to the core.

It will be further observed that the swivel action of the member 33 avoids all cramping and excessive strain upon the flexible body 13 and thus increases the period of its life.

We claim:—

1. In a harness cord construction having a multi-strand flexible wire core sheathed in braided textile, a ferrule comprising a cylindrical wall and an end flange extending inwardly to form an end opening, a prong struck from the material of the side wall in a plane longitudinal to the core of the harness cord and of sufficient length to imbed in the strands of the wire core, and an attaching member having a shank extending through the opening and an enlarged head within the ferrule engaging said flange.

2. In a harness cord construction having a multi-strand flexible wire core sheathed in braided textile, a ferrule comprising a cylindrical wall and an end flange extending inwardly to form an end opening, a flat, triangular prong struck from the material of the side wall in a plane longitudinal to the core of the harness cord, the apex being of sufficient length to imbed in the strands of the wire core, and an attaching member having a shank extending through the opening and an enlarged head within the ferrule engaging said flange.

OSCAR N. WHITEHEAD.
WALTER H. TOELLE.